April 21, 1931.  J. H. TRINDL  1,801,700
PISTON RING EXPANDER
Filed April 8, 1929  2 Sheets-Sheet 2
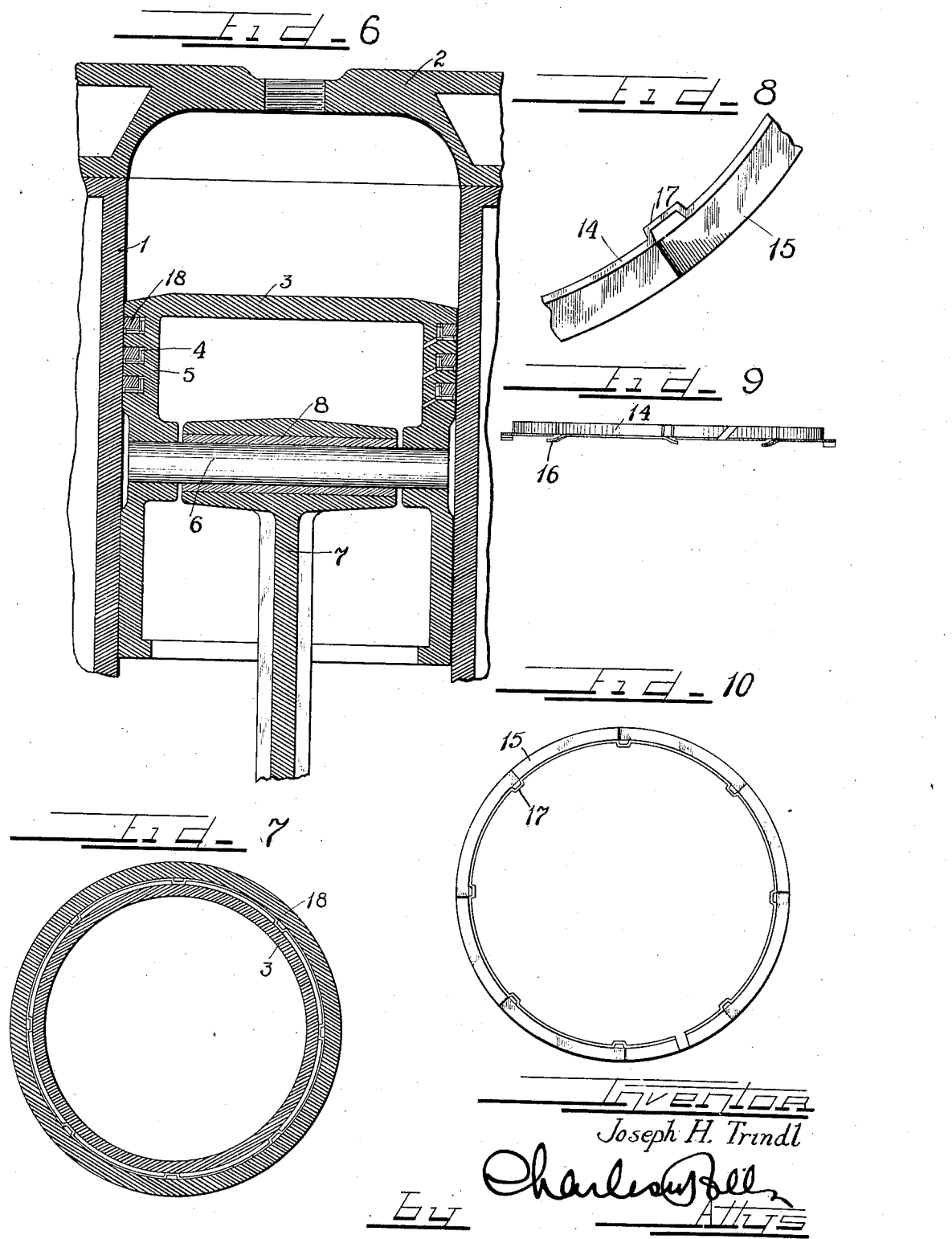

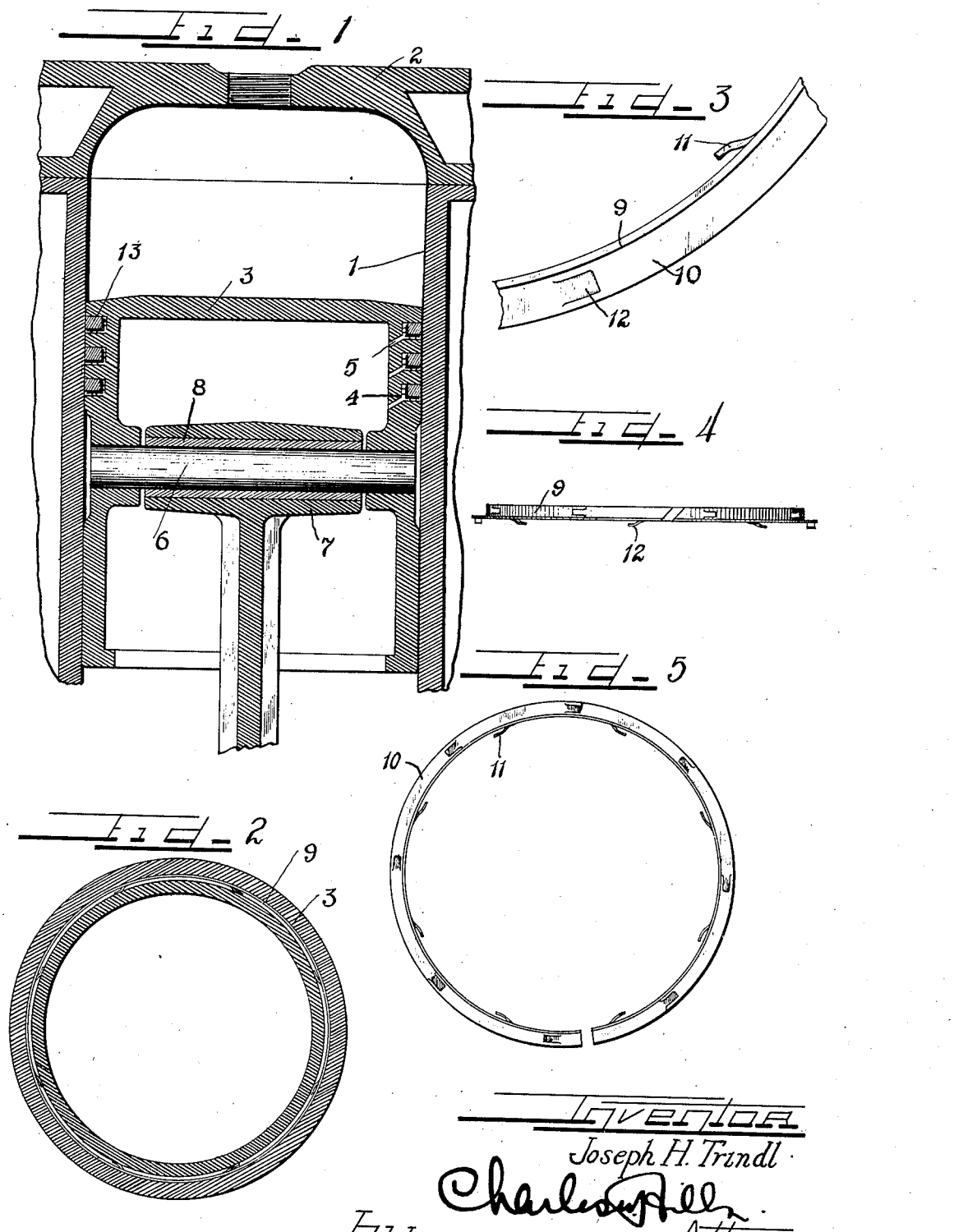

Patented Apr. 21, 1931

1,801,700

UNITED STATES PATENT OFFICE

JOSEPH H. TRINDL, OF AURORA, ILLINOIS

PISTON-RING EXPANDER

Application filed April 8, 1929. Serial No. 353,369.

This invention relates to a piston ring expander and particularly to one having compound radial and axial movements for causing a piston ring to conform to the cylinder wall throughout the piston travel, irrespective of the condition of the cylinder wall, to effect tight sealing between the piston and cylinder walls at all engine speeds.

An object of the invention is to provide a piston ring expander which will expand axially and radially within the piston ring groove.

Another object of the invention is to provide a piston ring expander of simple construction which will urge the ring in constantly tight engagement with the cylinder wall and also a side wall of the ring groove to prevent gas or liquid leakage to pass the ring.

A further object is to provide an expander for flexible piston rings which is so constructed as to be instantly responsive to any irregularities in the cylinder walls to flex the rings against the wall in sealing engagement.

The above, further and other objects of the invention will be apparent from the following description, accompanying drawings, and appended claims.

The invention is exemplified in the accompanying drawings and the views thereof are as follows:

Figure 1 is a fragmental vertical section through a portion of a cylinder and piston having the piston rings supported in expanders embodying this invention.

Figure 2 is a transverse section through a piston supplied with a piston ring and expander embodying this invention.

Figure 3 is an enlarged fragmental top plan view of a portion of one form of expander.

Figure 4 is a side elevational view of one form of the expander.

Figure 5 is a top plan view of one form of the expander.

Figure 6 is a view similar to Figure 1 showing a modified form of expander inserted in the piston ring grooves for supporting the piston rings.

Figure 7 is a transverse sectional view through a piston provided with an expander of the modified form illustrated in Figure 6.

Figure 8 is an enlarged fragmentary top plan view of an expander of the modified form.

Figure 9 is an elevational view of a piston ring expander of the modified form.

Figure 10 is a top plan view of the ring illustrated in Figure 9.

As shown on the drawings:

Figure 1 includes a cylinder 1, a top casting 2, and a piston 3. The piston is provided with ring grooves 4 having oil ducts 5 opening into the interior of the piston.

The piston is provided with the usual wrist pin 6 and connecting rod 7. A bearing 8 is interposed between the wrist pin 6 and the connecting rod.

The piston ring expander illustrated in Figures 1 through 5 inclusive of the drawings, consists of a split ring which is substantially right angled in cross-section, and includes an upstanding flange 9 and a horizontal flange 10.

A plurality of lugs or projections 11 are struck inwardly from the upstanding flange 9. The lugs 11 are shown as arranged in pairs with the same extending in opposite directions as illustrated. Similar lugs or projections 12 are struck downwardly from the horizontal flange 10 and preferably are arranged in pairs extending in opposite directions, as shown. However, the lugs may be arranged in any other manner than shown, if desired.

The expander is made of thin resilient metal, consequently the lugs 11 and 12 struck therefrom are resilient and serve as spring fingers for acting on the expander and its piston ring.

The several expanders are inserted in the ring grooves 4 of the piston 3 for supporting flexible piston rings 13 in said grooves. The tendency of the expanders is to urge the rings 13 radially outwardly and axially upwardly, thus maintaining the piston rings in tight engagement with the piston wall and the upper walls of the ring grooves.

An expander of this sort maintains the ring in tight engagement with the cylinder wall irrespective of any irregularity in its shape and also maintains the ring tightly against the upper wall of the groove, thus tightly sealing the ring groove in radial and axial direction against gas and liquid leakage. Furthermore, the expander being provided with the spring lugs 11 and 12 prevents pumping action of the ring in service, thus effectively sealing the piston within the cylinder.

The form of the invention illustrated in Figure 6 through 10 of the drawings, discloses a cylinder 1, a top casting 2, and a piston 3 with a wrist pin 6, connecting rod 7, and wrist pin bearing 8. The piston 3 is provided with the usual piston ring grooves 4 which grooves are shown as provided with oil ducts 5.

The expander of this form of the invention is similar to that illustrated in Figures 1 through 5 of the drawings in that it consists of an upstanding flange 14 and an outwardly directed radial flange 15. This ring, also, is split.

The radial flange 15 is provided with downwardly extending spring lugs 16 formed by depressing portions of the metal of the flange 15 to form the lugs.

The upstanding flange 14 is provided throughout its extent with a plurality of inwardly directed indentations 17 formed by drawing the metal of the flange 14 to provide the indentations.

The indentations 17 of the upstanding flange 14 are in effect spring members as the expander is made of thin spring metal. Such indentations 17 serve to center the expander in the piston ring groove and also tend to urge the expander radially of the piston, while the lugs 16 tend to urge the expander axially of the piston.

The indentations 17 may, of course, be pressed inwardly or outwardly of either of the flanges of the expander and will be made as long and on such curves as will produce a satisfactory spring effect when the expander is in use.

A piston ring 18 is supported in an expander of this form of the invention and is urged radially outwardly by reason of the spring indentations 17 and axially upwardly by reason of the spring lugs 16 depending from the radial flange 15 of the expander.

This form of the invention urges the ring radially outwardly as well as axially of the piston, thus effectively sealing the piston in the cylinder.

A perfect piston ring requires free radial movement of the ring which must be sufficient to allow the ring to conform to the cylinder wall at all speeds of the engine. The ring grooves increase in width in service and the piston rings must be supported in such manner as to compensate for such wear and must also form an effective seal to prevent oil pumping, caused by movement axially of the ring in the ring groove.

The piston ring expander if this invention, by reason of the compound action thereof, in urging the piston outwardly radially of the piston causes the ring to conform to the cylinder wall, and also the axial movement imparted to the ring by the spring lugs depending from the radial flanges of the expanders maintains the piston ring against the upper side wall of the piston ring groove to effectively seal the same. The lugs struck from the radial flanges of the expander prevent movement of the piston ring within the piston ring groove, thus eliminating objectionable oil pumping.

There are enough of the lugs and indentations provided on the piston ring expander of this invention to effectively maintain the piston rings at all times in tight engagement with the cylinder wall even though irregular, as well as with the wall of the piston ring groove.

The provision of the lugs 11 in the upstanding wall 9 of the form shown in Figures 1 through 5 and the indentation 17 formed in the upstanding wall 14 of the modification, serve to center the piston rings in the piston ring grooves as well as having the tendency to normally urge the piston rings radially outwardly of the piston into tight engagement with the cylinder walls.

The piston rings are flexible as are the piston ring expanders, and because of the provision of the sufficient number of lugs, the piston rings are maintained in tight engagement with the cylinder wall no matter how badly the same is worn.

The gist of this invention resides in the provision of the piston ring expander comprising a split thin metal spring ring having projections for exerting spring action radially and axially of the piston.

The expanders may be arranged, if desired to urge the piston rings radially outwardly and axially downwardly as well as upwardly.

The expander of this invention may be used with compression rings as well as with oil rings.

This invention contemplates expanders in which the spring fingers or lugs are directed outwardly of the axial flanges and upwardly from the radial flanges, that is with the fingers or lugs in direct contact with the piston rings instead of in contact with the ring grooves in the piston as in the forms illustrated in the drawings.

The form of lugs shown at 17 in Figures 8, 9, 10 and 11 as in the axial flange might of course be used in the radial flange of the expanders, in which event the fingers in the axial flange would be open at one end as shown at 16 in Figure 9. In other words the fingers 16 and 17 would be interchanged as to the expander flanges.

Tension of the expander is governed to some extent by the number size and shape of the fingers or lugs and also by the angular relation of the same with respect to the expander flanges.

The invention has been described herein, more or less precisely, yet it is to be understood that changes may be made in arrangement and proportion of parts and that equivalents may be substituted without departing from the spirit and scope of the invention.

I claim as my invention:

1. A piston ring expander having projections for urging the ring radially outwardly and other projectings for urging the ring axially.

2. A piston expander comprising a split ring of spring metal formed with an axial flange and a radial flange, said flanges having inwardly and downwardly directed spring fingers respectively struck from said flanges.

3. A piston ring expander comprising a split ring of angular form having an axial flange and a radial flange, said axial flange having inwardly extending portions struck therefrom for normally urging said ring radially outwardly when inserted in a piston ring groove.

4. A piston ring expander comprising an angular split ring of thin metal, said ring having an axial flange and an outwardly directed radial flange, said radial flange having downwardly extending projections struck therefrom for normally urging said expander toward a wall of a piston ring groove when said expander is inserted in said groove.

5. A piston ring expander comprising a split ring of angular cross-section having an axial flange and a radial flange, projections struck inwardly from said axial flange, projections struck downwardly from said radial flange, said projections acting as spring fingers to urge said expander radially outwardly and axially upwardly when said expander is inserted in a piston ring groove.

6. A piston ring expander comprising a split ring of angular cross-section having an axial flange and a radial flange, projections struck from said axial flange, projections struck from said raidial flange, said projections acting as spring fingers to urge said expander radially outwardly and axially when said expander is inserted in a piston ring groove.

7. A piston ring expander of spring metal having means struck from the body for urging the same radially and axially.

8. A piston ring expander of spring metal having fingers thereon for urging the same radially and axially.

9. A piston ring expander of flanged spring metal having means on the flanges thereof for urging the same radially and axially.

10. A piston ring expander having axial and radial flanges, portions of said flanges being struck therefrom to form springs for urging said expander axially and radially.

11. A piston ring expander having projections struck therefrom and effective for moving said expander and its associated piston ring axially and radially.

12. A piston ring expander of substantially circular outline and substantially right angled in cross section, said expander having portions formed from the body of the same and deflected with respect to said body for acting as spring members for causing radial and axial movement of the ring supported by said expander.

In testimony whereof I have hereunto subscribed my name at Chicago, Cook County, Illinois.

JOSEPH H. TRINDL.